Sept. 10, 1963  H. J. SAXENBERG  3,103,387
SKATE WHEEL WITH CHANGEABLE TIRES
Filed Dec. 18, 1961

INVENTOR.
HENRY J. SAXENBERG
BY
Paul S. Martin
ATTORNEY

United States Patent Office 3,103,387
Patented Sept. 10, 1963

3,103,387
SKATE WHEEL WITH CHANGEABLE TIRES
Henry J. Saxenberg, Long Island City, N.Y.
Filed Dec. 18, 1961, Ser. No. 160,070
10 Claims. (Cl. 301—5.7)

The present invention relates to skate wheels.

An important object of this invention resides in the provision of a novel skate wheel adapted to be assembled and taken apart quickly and with a minimum of complexity. The purpose of such a wheel is to enable changes of tires to be carried out easily.

In certain rinks, skaters are required to use skates with wheels of wood or the like. Outdoors, on sidewalks or other pavement, a different pair of skates or substitute wheels would be needed, since wooden wheels are not durable when exposed to abrasion. The present invention makes a single pair of skates readily adaptable to both indoor and outdoor use, by providing readily changeable tires. This invention makes it practical to use different sets of tires on skate wheels, as of wood, metal, rubber or various compositions, and to change from one set of tires to another, as desired. Complicated wheel structures heretofore proposed have rendered tire-changing in skate wheels uncommon, if not actually unknown in practice. Wooden tires may be used in rinks, and tough but quiet tires of rubber or the like may be substituted for outdoor use of the same skates.

Accordingly, a further object of this invention resides in the provision of changeable-tire skate wheels having a simplified and low-cost construction. A feature of the invention is to clear the way for the widespread use of changeable-tire skate wheels.

The foregoing and other objects of the invention, and further features of the invention, will be more fully understood and appreciated from the detailed description of a few illustrative embodiments thereof, shown in the accompanying drawings. In these embodiments, each wheel includes two confronting wheel-disc-and-bearing units that confine and support a tire between them. Each such unit includes a wheel disc that integrally incorporates the outer race for ball-bearings, and each unit includes a tubular bearing member that incorporates an inner race and retains the wheel disc and the tubular member in assembly to each other, containing the ball-bearings.

To remove the tire of such a wheel, it is necessary only to remove one of the wheel-disc-and-bearing units, as a unit; and no skill is needed for reassembling the wheel with a substitute tire. The wheel construction involves a minimum number of parts of relatively simply and low-cost form. Consequently, it becomes practical to replace tires, rather than to be forced to substitute whole wheels when worn, or to use different skates as required by indoor or outdoor skating conditions.

The nature and features of the invention will be readily understood from the following detailed description of a few embodiments shown in the drawings. In those drawings.

Figure 1:
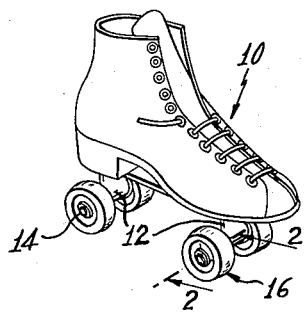
FIG. 1 is a perspective view of a skate, drawn to small scale.
Figure 2:
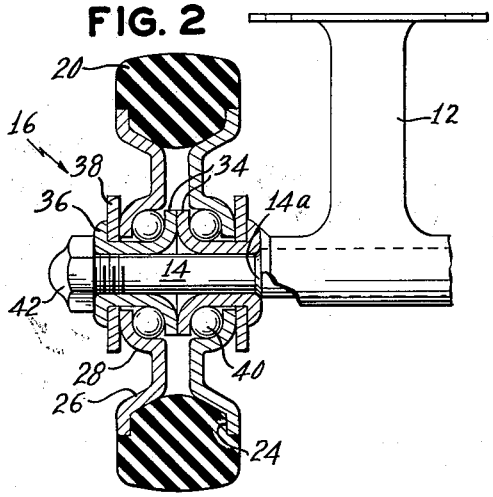
FIG. 2 is an enlarged vertical cross-section of a portion of the skate in FIG. 1, at the plane designated 2—2.
Figure 3:
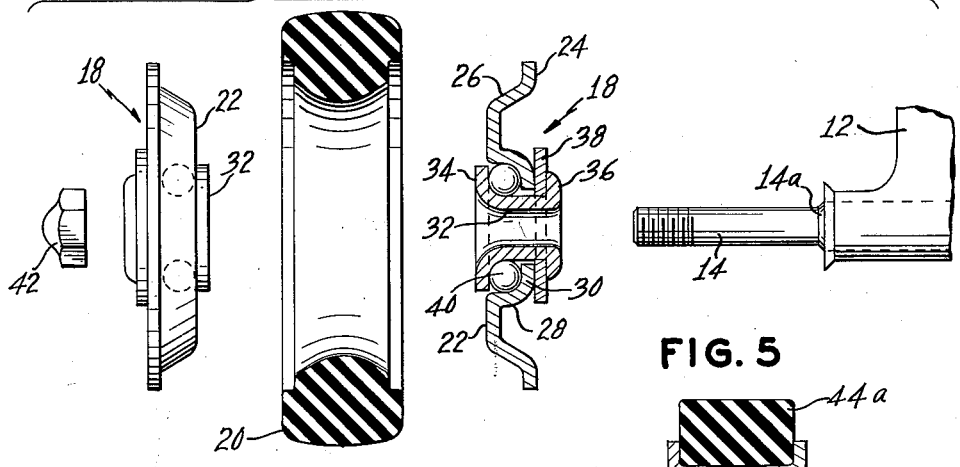
FIG. 3 is an exploded view of the component parts in FIG. 2, shown partly in cross-section.

Referring now to FIGS. 1-3, inclusive, a so-called shoe skate is shown in FIG. 1, including a shoe 10 and four wheels arranged in front and back pairs on corresponding axles 14, as is usual. A pair of brackets 12 support the shoe, each bracket 12 containing one transversely extending shaft 14 that carries a wheel 16 at each end.

FIGS. 2 and 3 show a wheel incorporating certain features of the invention. Each wheel includes a pair of wheel-and-bearing or side units 18 which are identical to each other and which confront each other at opposite sides of tire 20. This tire may be of rubber or of wood, or of metal or any suitable substitute material. Each wheel-and-bearing unit 18 includes a wheel disc 22 that is shaped, peripherally, to support and confine tire 20. To this end, wheel disc 22 includes a peripheral flange portion 24 that is disposed laterally of a portion of the tire when the wheel is assembled, and an annular shoulder portion 26 that extends integrally from flange portion 24 toward the vertical plane midway between the confronting side units 18 in FIG. 2. Each wheel disc 22 also includes a central portion formed to provide an outer ball-bearing race. This ball-bearing race includes a bearing portion 28 that extends generally perpendicularly to the mean plane mentioned above, and a portion 30 that extends generally radially.

Each side unit also includes a central tubular bearing member 32 that has a flange at each axial end. One flange 34 and the adjoining portion of the tubular member constitutes an inner ball-bearing race, and the opposite flange 36 is a retaining flange. A washer 38 is disposed between retaining flange 36 and portion 30 of the outer ball-bearing race. A train of ball-bearings 40 is contained within the inner and outer ball-bearing races described.

In manufacturing one of the side units 22, the tubular portion 32 is formed initially with only one flange 34, the axial extent of the tubular portion being greater than that illustrated. The ball-bearings 40, washer 38 and the wheel disc 22 are assembled to the tubular member 32. The projecting tubular end of member 32 is subjected to a spinning or other up-setting operation to form flange 36. In this way, the parts are fixed in assembly as shown.

In the assembled condition of the wheel, portions 34 of the two aligned inner ball-bearing races are in abutment with each other (FIG. 2), being held in this condition by a nut 42 on the end of shaft 14, which holds the two wheel-and-bearing units together, against shoulder 14a of the supporting shaft 14. Nut 42 may be tightened forcibly without any danger of binding developing in the ball-bearing races; and by virtue of the wheel-and-bearing unit construction described, tire 20 is reliably held in place. Nothing except nut 42 and shaft 14 is needed to hold the three parts of the wheel in assembly as illustrated in FIG. 2 (the two side units and the tire) and in disassembling the wheel for changing a tire, there are only the same three parts to be handled. Furthermore, the side units are identical to each other and thus they are interchangeable. This makes for simple and economical manufacture, and its facilitates distribution of parts.

It is thus seen that a new form of skate wheel is made available that is of low-cost construction; that effectively supports a changeable tire; and is of minimum complexity both from the point of view of manufacture and from the point of view of use in effecting a change of tires.

Figure 4:
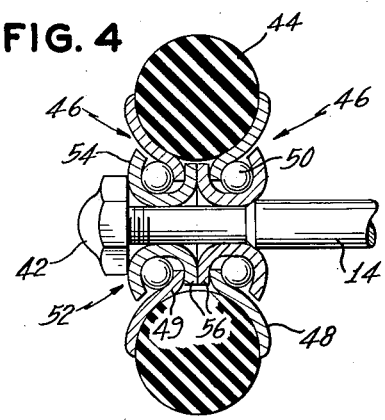
FIGS. 4 and 5 are two further modifications of the construction shown in FIG. 2.

FIG. 4 shows another form of novel skate wheel embodying certain of the features of the invention and attaining certain of the advantages of the embodiment in FIGS. 2 and 3.

The skate wheel in FIG. 4 involves a tire 44 which is of proportionally greater cross-section than that in FIGS. 2 and 3. Tire 44 is round in cross-section. This tire is supported by a pair of confronting wheel-and-bearing or side units 46 on shaft 14. Each unit 46 includes a wheel disc 48 having a peripheral portion that includes both radial and axially extending component portions. The peripheral formation shown is complementary to the tire, and corresponds to portions 24 and 26 of the embodiment in FIGS. 2 and 3, for laterally confining and radially supporting tire 44. Wheel disc 48 correspondingly includes a central portion 49 that constitutes an outer race for the ball-bearings. Each member 52 also includes a retaining flange 56 at the end thereof opposite flange 54. In manufacturing the wheel-and-support units 46, the same assembly procedure is followed as previously described in connection with the embodiment of FIGS. 2 and 3, flange 56 being formed after the parts otherwise assembled in the configuration shown.

When the two units 46 are assembled as illustrated in FIG. 4, retaining flanges 56 abut each other. The central portions of wheel-discs 48 are disposed between the respective trains of ball-bearings 50 and retaining flanges 56. Comparing FIG. 2 and FIG. 4, the central portions of the wheel discs in FIG. 2 are disposed outside the ball-bearings, whereas in FIG. 4 the central portions of the wheel discs are disposed between the two trains of ball-bearings. In this respect, the embodiment of FIG. 4 has a particular advantage. In the event of any horizontal force being applied to tire 44, such as occurs in various degrees while skating, tire 44 applies that force to wheel disc 48 which, in turn, applies that force to the associated train of ball-bearings. In the embodiment of FIG. 2, this lateral force is, instead, applied to washer 38. On the other hand, the wheel construction of FIG. 2, in the form illustrated, is better protected against the possibility of dirt entering the ball-bearing races.

Figure 5:
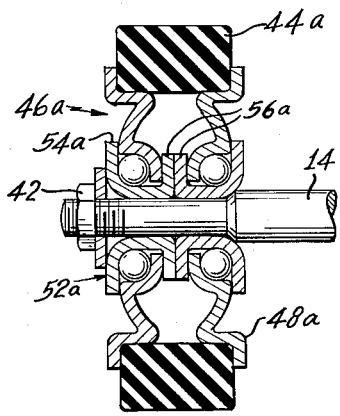

In FIG. 5 there is illustrated a further embodiment of the invention. This embodiment very closely resembles that in FIG. 4. The parts in FIG. 5 which correspond to those in FIG. 4 carry the same reference numerals together with a small "a." The similarity is believed sufficient so that detailed description of the parts in FIG. 5 appears unnecessary. In the embodiment of FIG. 5, the component portions are more nearly identical in proportion to the parts found in FIGS. 2 and 3; but the relationship between the central portion of the wheel discs and the two trains of ball-bearings in FIG. 5 corresponds to that in FIG. 4. Retaining flanges 56a abut each other in the assembled wheel, so that any lateral component of force on tire 44a that is developed during skating is taken up by pressures applied by one of the wheel discs against the ball-bearings.

It is apparent that further variations and modified shapes of the parts will occur to those skilled in the art. Consequently, the invention should be broadly construed in accordance with its full spirit and scope.

What is claimed is:

1. A skate wheel, including a tire and a pair of confronting wheel-and-bearing units, each said unit including a wheel disc having a rim portion contoured to radially support and laterally retain the tire and a central portion contoured as an outer ball-bearing race, each wheel-and-bearing unit also including a tubular bearing member having a first flange at one end thereof, said first flange and the adjoining portion of said tubular bearing member being formed as an inner ball-bearing race and said tubular bearing member having a second flange at the opposite end thereof, and a train of ball-bearings between said inner and outer races, said wheel disc being interposed and confined between said second flange and said train of ball-bearings.

2. A skate wheel, including a tire and a pair of confronting wheel-and-bearing units, each said unit including a wheel disc having a rim portion contoured to radially support and laterally retain the tire and a central portion contoured as an outer ball-bearing race, each wheel-and-bearing unit also including a tubular bearing member, one end of said member having a first flange and being formed as an inner ball-bearing race and said tubular member having a second flange at the opposite end thereof to act as a wheel disc retainer, and a train of ball bearings between said inner and outer races, the radially innermost portion of said wheel disc being disposed between said second flange and the train of ball bearings, the second flanges of said pair of confronting units abutting each other.

3. A skate wheel, including a tire and a pair of confronting wheel-and-bearing units, each said unit including a wheel disc having a rim portion contoured to radially support and laterally retain the tire and a central portion contoured as an outer ball-bearing race, each wheel-and-bearing unit also including a tubular bearing member, one end of said member having a first flange and being formed as an inner ball-bearing race and said tubular member having a second flange at the opposite end thereof to act as a wheel disc retainer, and a train of ball bearings between said inner and outer races, the first flanges of said tubular bearing members abutting each other, and the radially innermost portions of said wheel discs being remote from each other relative to said first flanges, and a washer between said second flange of each said tubular bearing member and said innermost portion of the corresponding wheel disc.

4. A skate wheel having a tire and a pair of confronting wheel units, each wheel unit including a rim formed to include a peripheral tire-retaining flange and a tire-supporting annular shoulder, and each wheel unit including a central portion formed as an annular ball-bearing outer race, each wheel unit having a tubular inner bearing member including a retainer flange disposed axially adjacent to said outer race and an opposite flanged portion contoured as an inner ball-bearing race, and a train of ball bearings confined in said races, said retainer flange and said ball bearings being disposed at opposite sides, axially, of the radially innermost portion of said outer race.

5. A skate wheel having a readily changeable tire, including first and second confronting wheel units and a tire confined therebetween, each said wheel unit including a sleeve having a first flange and formed to provide an inner ball-race and having an opposed retaining flange, a circular series of ball bearings, and a wheel disc including a tire-supporting peripheral shoulder and a central portion forming an outer ball-bearing race, said retaining flange cooperating with said outer race to confine said outer and inner races in ball-containing assembly to each other, and a tire confined between and supported on said wheel discs.

6. A skate wheel in accordance with claim 5 wherein the radially innermost portions of the wheel discs are disposed between said trains of ball bearings so that endwise thrust of a tire against either wheel disc causes the radially innermost portion of that wheel disc to bear against the corresponding ball bearings.

7. A skate wheel including a tire and a pair of confronting wheel units, each said wheel unit including a wheel disc, a tubular bearing member, and a train of ball bearings, said wheel discs being disposed symmetrically at opposite sides of a mean plane, the contour of a radial cross-section of each wheel disc extending from its peripheral edge radially inward to form a tire-retaining flange portion, then toward said mean plane to form a tire-supporting shoulder portion, thereafter including a bearing portion extending generally perpendicular to said plane, and finally radially inward as a lateral race portion, said last two portions constituting an outer ball-bearing race, said tubular bearing member including a central portion and an end flange portion constituting an inner ball-bearing race and said tubular bearing member also including a retaining flange portion axially opposite said end flange portion, the lateral race portion of said wheel disc being disposed between said train of ball bearings and said retaining flange portion, said train of ball bearings being contained and confined in said outer and inner races.

8. A skate wheel including a tire and a pair of confronting wheel units, each said wheel unit including a wheel disc, a tubular bearing member, and a train of ball bearings, said wheel discs being disposed symmetrically at opposite sides of a mean plane, the contour of a radial cross-section of each wheel disc extending from its peripheral edge radially inward to form a tire-retaining flange portion, then toward said mean plane to form a tire-supporting shoulder portion, thereafter including a bearing portion extending generally perpendicularly away from said plane, and finally radially inward as a lateral race portion, said last two portions constituting on outer ball-bearing race, said tubular bearing member including a central portion and an end flange portion constituting an inner ball-bearing race and said tubular bearing member also including a retaining flange portion axially opposite said end flange portion, the lateral race portion of said wheel disc being disposed between said train of ball bearings and said retaining flange portion, said train of ball bearings being contained and confined in said outer and inner races.

9. A skate wheel including a tire and a pair of confronting wheel units, each said wheel unit including a wheel disc, a tubular bearing member, and a train of ball bearings, said wheel discs being disposed symmetrically at opposite sides of a mean plane, the contour of a radial cross-section of each wheel disc extending from its peripheral edge radially inward to form a tire-retaining flange portion, then toward said mean plane to form a tire-supporting shoulder portion, thereafter including a bearing portion extending generally perpendicularly toward said plane, and finally radially inward as a lateral race portion, said last two portions constituting an outer ball-bearing race, said tubular bearing member including a central portion and an end flange portion constituting an inner ball-bearing race and said tubular bearing member also including a retaining flange portion axially opposite said end flange portion, the lateral race portion of said wheel disc being disposed between said train of ball bearings and said retaining flange portion, said train of ball bearings being enclosed in said outer and inner races.

10. A skate wheel in accordance with claim 7, wherein each wheel disc has directly opposite annular surfaces in engagement with said ball-bearings and with said tire, respectively.

References Cited in the file of this patent

UNITED STATES PATENTS

| 1,855,316 | Schacht | Apr. 26, 1932 |
| 1,943,881 | Ware | Jan. 16, 1934 |
| 2,136,531 | Vogt | Nov. 15, 1938 |
| 3,027,205 | Atkinson | Mar. 27, 1962 |

FOREIGN PATENTS

| 779,518 | France | Jan. 14, 1935 |